United States Patent [19]

Tanaka et al.

[11] Patent Number: 5,384,056

[45] Date of Patent: *Jan. 24, 1995

[54] POLYCARBONATE AND USE THEREOF

[75] Inventors: Masahide Tanaka; Tadaaki Fujimoto; Kazunori Takahata, all of Yamaguchi, Japan

[73] Assignee: Mitsui Petrochemical Industries, Ltd., Tokyo, Japan

[*] Notice: The portion of the term of this patent subsequent to Mar. 15, 2011 has been disclaimed.

[21] Appl. No.: 3,426

[22] Filed: Jan. 12, 1993

[30] Foreign Application Priority Data

Jan. 13, 1992 [JP] Japan .................... 4-003960

[51] Int. Cl.$^6$ ............ C10M 129/02; C09K 5/00
[52] U.S. Cl. ............................ 252/56 R; 252/68; 558/265; 558/266
[58] Field of Search ............. 558/265, 266; 252/56 R, 252/68

[56] References Cited

U.S. PATENT DOCUMENTS

| | | | |
|---|---|---|---|
| 2,379,252 | 6/1945 | Muskat et al. | 558/266 |
| 2,387,934 | 10/1945 | Muskat et al. | 558/266 |
| 3,632,828 | 1/1972 | Freuel | 558/276 |
| 3,725,455 | 4/1973 | D'Angelo et al. | 558/266 |
| 4,072,704 | 2/1978 | Langdon | 558/266 |
| 4,217,298 | 8/1980 | Shikata et al. | 558/265 |
| 5,114,605 | 5/1992 | Mizui et al. | 252/68 |

FOREIGN PATENT DOCUMENTS 2110234  6/1983  United Kingdom .

*Primary Examiner*—Prince Willis, Jr.
*Assistant Examiner*—James M. Silbermann
*Attorney, Agent, or Firm*—Sherman and Shalloway

[57] ABSTRACT

The polycarbonate of the invention is a polycarbonate derived from adducts such as propylene oxide adducts of polyglycerols. The lubricating oil of the invention comprises this polycarbonate, and if necessary, a specific polycarbonate having a —$C_2H_4O$— group and/or a —$CH_2CH(CH_3)O$— group in its main chain. The lubricating oil of the invention can be used as a lubricating oil for refrigerators such as automotive air-conditioner and electric refrigerator. In particular, the lubricating oil of the invention is suitable as a lubricating oil for refrigerator wherein high-viscosity lubricating oil is used, for example, lubricating oil for automotive rotary air-conditioner, and also suitable as lubricating oil for a refrigerator wherein ozone layer-nondestructive hydrogenated fluorocarbon such as R-134a is used as a refrigerant.

4 Claims, 2 Drawing Sheets

POLYCARBONATE AND USE THEREOF

FIELD OF THE INVENTION

The present invention relates to a novel polycarbonate and use thereof, more particularly to a high-viscosity polycarbonate which is excellent in compatibility with ozone layer-nondestructive hydrogenated fluorocarbon useo as a refrigerant for refrigerators such as R-134a, and also excellent in lubricating properties. The invention also relates to a lubricating oil comprising this polycarbonate.

BACKGROUND OF THE INVENTION

With the alteration of refrigerant gas or refrigerators to hydrogenated fluorocarbon (HFC) such as R-134a ($CH_2F$—$CF_3$) which is nondestructive to the ozone layer, mineral oils or alkylbenzene compounds having been heretofore used as lubricating oils for refrigerators have come not to be used therefor because they have no compatibility with the refrigerant gas. Instead of those oils or compounds, other compounds such as polypropylene glycol, polypropylene glycol monoalkyl ether and polypropylene glycol dialkyl ether have come to be used as lubricating oils for refrigerators. However, uhese compounds are low in compatibility with R-134a, and among these compounds, high-viscosity compounds showing a kinematic viscosity at 100° C. of not less than 15 cSt have such a problem that they exhibit poor performance as lubricating oils for refrigerators such as those for automotive rotary air-conditioner because of low compatibility with R-134a.

This problem is involved not only in the hydrogenated fluorocarbon which is nondestructive to the ozone layer but also in hydrogenated chlorofluorocarbon (HCFC) which is small in ozone depletion potential and mixtures of the hydrogenated fluorocarbon and the hydrogenated chlorofluorocarbon.

Examples of the hydrogenated fluorocarbons include the above-mentioned R-134a and R-152a, and examples of the hydrogenated chlorofluorocarbons include R-22, R-123 and R-124.

By the way, it is known that if a lubricating oil having polarity such as an ester group is used to enhance the compatibility with R-134a, the lubricating oil is deteriorated in lubricating performance on surface of a metal device.

Accordingly, there has been heretofore desired no only the advent of compounds having high viscosity and showing high compatibility with R-134a but also the avent of lubricating oils for refrigerators containing these compounds.

OBJECT OF THE INVENTION

The present invention is intended to solve such problems associated with the prior art as mentioned above, and an object of the invention is to provide a polycarbonate which is excellent in lubricating properties and shows high viscosity and good compatibility with ozone layer-nondestructive hydrogenated fluorocarbons and with hydrogenated chlorofluorocarbons having small ozone depletion potential. Another object of the invention is to provide a lubricating oil comprising the above-mentioned polycarbonate.

SUMMARY QF THE INVENTION

The polycarbonate of the invention is a novel polycarbonate represented by the following general formula wherein $R_1$ is a group represented by the following formula [I]:

$$R_1O\text{—}[CH_2CH(OR_1)CH_2O]_x\text{—}R_1 \quad \text{I}$$

wherein $R_1$ is a group represented by the following formula (A), and x is an integer of 2 to 30;

$$\text{—}(ZO)_mCOOR_2 \quad \text{(A)}$$

wherein $R_2$ is each independently a hydrocarbon group having not more than 30 carbon atoms or a hydrocarbon group containing an ether linkage and having 2 to 30 carbon atoms, Z is an alkylene group selected from an ethylene group and a propylene group, and m is an integer of 1 to 24.

A first lubricating oil of the invention is a lubricating oil comprising a polycarbonate represented by the above general formula [I].

A second lubricating oil of the invention is a lubricating oil comprising a polycarbonate represented by the above general formula [I]and a polycarbonate represented by the following general formula [II]:

$$R_3OCOO[(R_4O)_pCOO]_nR_3 \quad \text{II}$$

wherein $R_3$ is a hydrocarbon group having 1 to 10 carbon atoms or a glycol ether group represented by the formula $R_5(OR_6)_y$— wherein $R_5$ is a hydrocarbon group having 1 to 10 carbon atoms, $R_6$ is an ethylene group or a propylene group, and y is an integer of 1 to 10; $R_4$ is an alkylene group having 2 to 20 carbon atoms; p is an integer of 1 to 100; and n is an integer of 1 to 10.

The above-mentioned lubricating oils are particularly suitable as those for refrigerators wherein ozone layer-nondestructive hydrogenated fluorocarbon such as R-134a is used as a refrigerant.

DETAILED DESCRIPTION OF THE INVENTION

Figure 1:
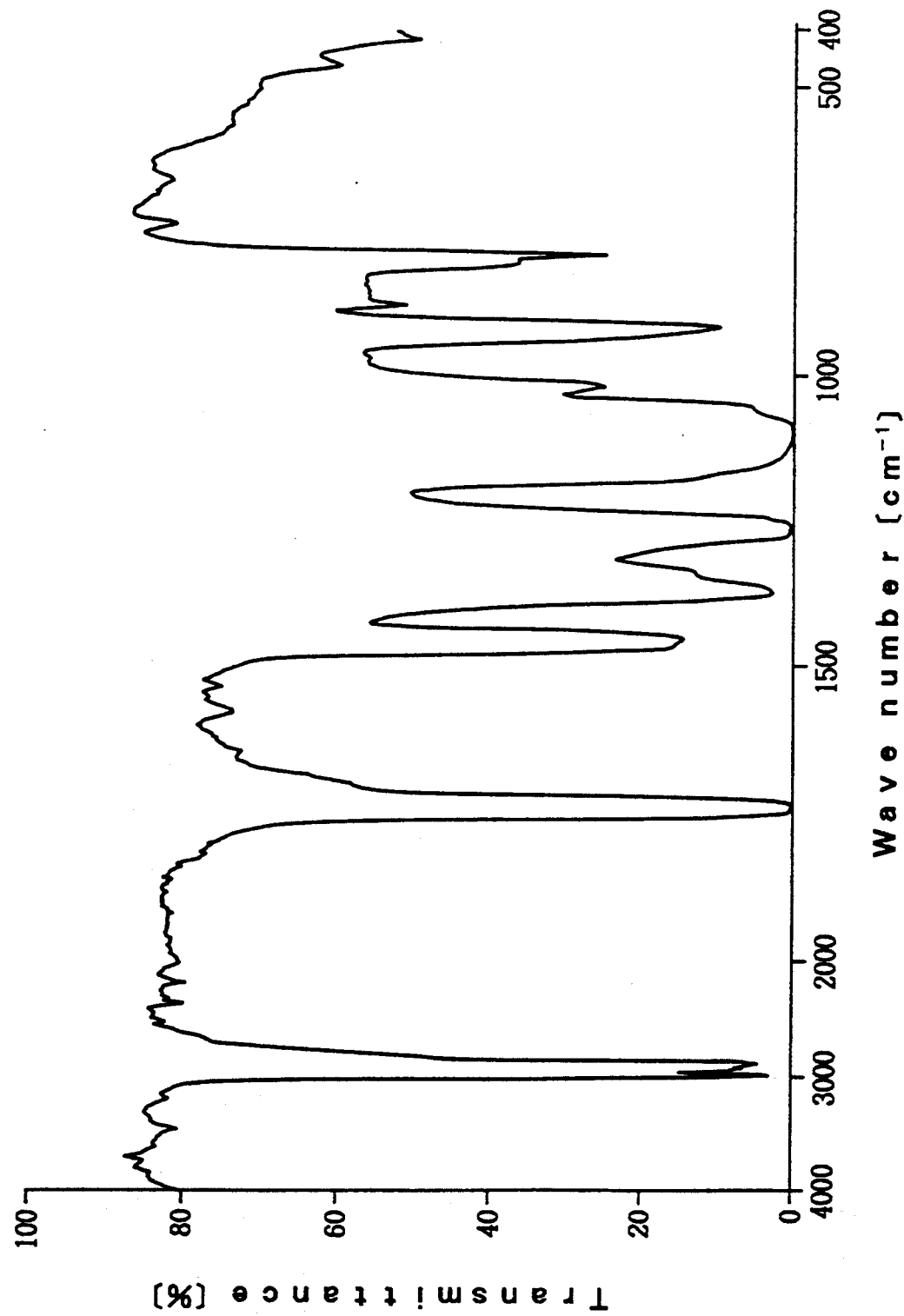
FIG. 1 is a view showing an infrared absorption spectrum of polycarbonate obtained in Example 1.

The polycarbonate and the lubricating oils according to the present invention are described in detail hereinafter.

The polycarbonate of the invention is a novel polycarbonate of polyglycerol type represented by the following general formula [I].

$$R_1O\text{—}[CH_2CH(OR_1)CH_2O]_x\text{—}R_1 \quad \text{I}$$

In the formula [I], $R_1$ is a group represented by the following formula (A) , and x is an integer of 2 to 30.

$$\text{—}(ZO)_mCOOR_2 \quad \text{(A)}$$

In the formula (A), $R_2$ is each independently a hydrocarbon group having not more than 30 carbon atoms or a hydrocarbon group containing an ether linkage and having 2 to 30 carbon atoms, Z is an alkylene group selected from an ethylene group and a propylene group, and m is an integer of 1 to 24.

The group represented by the above formula (A) is classified into the following three kinds.

(1) $-(C_3H_6O)_s(C_2H_4O)_tCOOR_2$
(2) $-(C_2H_4O)_t(C_3H_6O)_sCOOR_2$
(3) a group obtained by linking $-C_2H_4O-$ group and $-C_3H_6O-$ group at random and a total number of the $-C_2H_4O-$ group and the $-C_3H_6O-$ group is 3 to 24.

In the above-mentioned each groups (1) to (3), $R_2$ is each independently a hydrocarbon group having not less than 30 carbon atoms or a hydrocarbon group containing an ether linkage and having 2 to 30 carbon atoms, and s+t is an integer of 1 to 24.

In the invention, with respect to the above-mentioned each groups (1) to (3), when the number (t) of the $-C_2H_4O-$ group is not 0, a ratio (s/t) of the number (s) of the $-C_3H_6O-$ group to the number (t) of the $-C_2H_4O-$ group is generally in the range of 0.5 to 20, preferably 1 to 10, more preferably 2 to 6. Further, when the number (t) of the $-C_2H_4O-$ group is 0, the number (s) of the $-C_3H_6O-$ group is generally in the range of 1 to 24, preferably 1 to 12, more preferably 2 to 8.

Examples of the hydrocarbon group indicated by $R_2$ in the above formula (A) include aliphatic hydrocarbon group, alicyclic hydrocarbon group, aromatic hydrocarbon group, aromatic aliphatic hydrocarbon group, and glycol ether group represented by the formula $-(R_7-O)_q-R_8$ wherein $R_7$ is an alkylene group of 2 to 3 carbon atoms, $R_8$ is a hydrocarbon group of not more than 28 carbon atoms, and q is an integer of 1 to 20.

Concrete examples of the aliphatic hydrocarbon group indicated by $R_2$ include methyl group, ethyl group, n-propyl group, isopropyl group, n-butyl group, isobutyl group, s-butyl group, t-butyl group, pentyl group, isopentyl group, neopentyl group, n-hexyl group, 2,3-dimethylbutyl group, isohexyl group, n-heptyl group, isoheptyl group, n-octyl group, 2-ethylhexyl group, isooctyl group, n-nonyl group, isononyl group, n-decyl group, isodecyl group, n-undecyl group, isoundecyl group, n-dodecyl group, isododecyl group, n-tridecyl group, isotridecyl group, n-tetradecyl group, isotetradecyl group, n-pentadecyl group, isopentadecyl group, n-hexadecyl group, isohexadecyl group, n-heptadecyl group, isoheptadecyl group, n-octadecyl group, isooctadecyl group, n-nonyldecyl group, isononyldecyl group, n-eicosanyl group, isoeicosanyl group, 2-ethylhexyl group and 2-(4-methylpentyl) group.

Concrete examples of the alicyclic hydrocarbon group indicated by $R_2$ include cyclohexyl group, 1-cyclohexenyl group, methylcyclohexyl group, dimethylcyclohexyl group, decahydronaphthyl group and tricyclodecanyl group.

Concrete examples of the aromatic hydrocarbon group indicated by $R_2$ include phenyl group, o-tolyl group, p-tolyl group, m-tolyl group, 2,4-xylyl group, mesityl group and 1-naphthyl group.

Concrete examples of the aromatic aliphatic hydrocarbon group indicated by $R_2$ include benzyl group, methylbenzyl group, β-phenylethyl group (phenethyl group), 1-phenylethyl group, 1-methyl-1-phenylethyl group, p-methylbenzyl group, styryl group and cinnamyl group.

Concrete examples of the alkylene group indicated by the above $R_7$ include ethylene group, propylene group and trimethylene group.

The hydrocarbon group indicated by the above $R_8$ includes aliphatic hydrocarbon group, alicyclic hydrocarbon group and aromatic hydrocarbon group. As concrete examples of these hydrocarbon groups, there can be mentioned the same groups as exemplified with respect to the aforesaid aliphatic hydrocarbon group, alicyclic hydrocarbon group and aromatic hydrocarbon group indicated by $R_2$.

Concrete examples of the hydrocarbon group having an ether linkage which is indicated by $R_2$, that is, the glycol ether group represented by the above-mentioned formula, include ethylene glycol monomethyl ether group, ethylene glycol monobutyl ether group, diethylene glycol mono-n-butyl ether group, triethylene glycol monoethyl ether group, propylene glycol monomethyl ether group, propylene glycol monobutyl ether group, dipropylene glycol monoethyl ether group and tripropylene glycol mono-n-butyl ether group.

In the case of using the polycarbonate represented by the above formula [I] as a lubricating oil in a refrigerator wherein an ozone layer-nondestructive hydrogenated fluorocarbon such as R-134a is used as a refrigerant, preferred as $R_2$ are lower alkyl groups such as methyl group, ethyl group, isopropyl group, n-butyl group and isoamyl group; and alkylene glycol monoalkyl ether groups such as ethylene glycol monomethyl ether group, ethylene glycol monobutyl ether group, diethylene glycol monomethyl ether group, triethylene glycol monoethyl ether group, propylene glycol monomethyl ether group, propylene glycol monobutyl ether group, dipropylene glycol monoethyl ether group and tripropylene glycol mono-n-butyl ether group.

The polycarbonates represented by the above formula [I] sometimes exist in the form of a mixture of several kinds of polycarbonates each represented by the formula [I] which differ from each other in the x value, and in this case, x is expressed by an average value and does not take an integer. In this case, a polycarbonate represented by the formula [I] wherein x is 0, 1 or not less than 31 may be contained in the mixture of polycarbonates each represented by the formula [I] in such an amount that the objects of the invention can be accomplished without hindrance.

Examples of the polycarbonates represented by the above formula [I] are given below.

(1) $R_1O-[CH_2CH(OR_1)CH_2)CH_2O]_x-R_1$
$R_1$ in the above formula:
  $-[CH_2CH(CH_3)O]_mCOOCH_3$ [m=1-12, x=2-12]
  [m=1-12, x=2-12]

(2) $R_1O-[CH_2CH(OR_1)CH_2O]_x-R_1$
$R_1$ in the above formula:
  [m=1-12, x=2-12]
  [=1-12, x=2-12]

(3) $R_1O-[CH_2CH(OR_1)CH_2O]_x-R_1$
$R_1$ in the above formula:
  $-[CH_2CH(CH_3)O]_mCOOCH(CH_3)_2$
  [m=1-12, x=2-12]

(4) $R_1O-[CH_2CH(OR_1)CH_2O]_x-R_1$
$R_1$ in the above formula:
  $-[CH_2CH(CH_3)O]_mCOO(CH_2)_3CH(CH_3)_2$
  [m=1-12, x=2-12]

(5) $R_1O-[CH_2CH(OR_1)CH_2O]_x-R_1$
$R_1$ in the above formula:
  $-[CH_2CH(CH_3)O]_mCOOCH_2CH(CH_3)OCH_3$
  [m=1-12, x=2-12]

(6) $R_1O-[CH_2CH(OR_1)CH_2O]_x-R_1$
$R_1$ in the above formula:
  $-CH_2CH_2O[CH_2CH(CH_3)O]_mCOOCH(CH_3)_2$
  [m=1-5, x=2-12]

(7) $R_1O-[CH_2CH(OR_1)CH_2O]_x-R_1$
$R_1$ in the above formula:
—$[CH_2CH_2O]_mCOOCH_3$
[=1-12, x=2-12]

(8) $R_1O-[CH_2CH(OR_1)CH_2O]_x-R_1$
$R_1$ in the above formula:
—$[CH_2CH(CH_3)O]_s(CH_2CH_2O]_tCOOCH(CH_3)_2$
[s=1-6, t=1-6, x=2-12]

(9) $R_1O-[CH_2CH(OR_1)CH_2O_x-R_1$
$R_1$ in the above formula:
—$[CH_2CH(CH_3)O]_mCOOCH_2CH_2OC_2H_5$ [m=1-12, x=2-12]

(10) $R_1O-[CH_2CH(OR_1)CH_2O]_x-R_1$
$R_1$ in the above formula:
—$[CH_2CH_2O]_mCOO[CH_2CH(CH_3)]OC_2H_5$
[m=1-12, x=2-12]

(11) $R_1O-[CH_2CH(OR_1)CH_2O]_x-R_1$
$R_1$ in the above formula:
—$CH_2CH(CH_3)O]_mCOOCH_2CH(C_2H_5)-(CH_2)_3CH_3$[=1-6, x=2-12]

(12) $R_1O-[CH_2CH(OR_1)CH_2O]_xR_1$
$R_1$ in the above formula:
—$[CH_2CH(CH_3)O]_mCOOCH(CH_3)_2$
[m=1-6, x=2-12]

(13) $R_1O-[CH_2CH(OR_1)CH_2O]_x-R_1$
$R_1$ in the above formula:
—$[CH_2CH(CH_3)O]_{m-1}(C_2H_4O)COOCH_3$
[m=2-8, x=2-12]

(14) $R_1O-[CH_2CH(OR_1)CH_2O]_x-R_1$
$R_1$ in the above formula:
—$[CH_2CH(CH_3)O]_{m-1}(C_2H_4O)-COOCH_2CH(C_2H_5)-(CH_2)_3CH_3$
[m=2-8, x=2-12]

(15) $R_1O-[CH_2CH(OR_1)CH_2O]_x-R_1$
$R_1$ in the above formula:
—$[CH_2CH(CH_3)O]_{m-1}(C_2H_4O)COOCH(CH_3)_2$
[m=2-8, x=2-12]

(16) $R_1O-[CH_2CH(OR_1)CH_2O]_x-R_1$
$R_1$ in the above formula:
—$(C_2H_4O)_mCOOCH_3$
[m=1-10, x=2-12]

(17) $R_1O-[CH_2CH(OR_1)CH_2O]_x-R_1$
$R_1$ in the above formula:
—$(C_2H_4O)_mCOOCH_2CH(C_2H_5)-(CH_2)_3CH_3$
[m=1-10, x=2-12]

(18) $R_1O-[CH_2CH(OR_1)CH_2O]_x-R_1$
$R_1$ in the above formula:
—$(C_2H_4O)_mCOOCH(CH_3)_2$
[m=1-10, x=2-12]

(19) $R_1O-[CH_2CH(OR_1)CH_2O]_x-R_1$
$R_1$ in the above formula:
—$(C_2H_4O)_m(C_3H_6O)_mCOOCH_3$
[m=1-10, x=2-12]

(20) $R_1O-[CH_2CH(OR_1)CH_2O]_x-R_1$
$R_1$ in the above formula:
—$(C_2H_4O)_m(C_3H_6O)_mCOOCH_2CH(C_2H_5)-(CH_2)_3CH_3$
[m=1-10, x=2-12]

(21) $R_1O-[CH_2CH(OR_1)CH_2O]_x-R_1$
$R_1$ in the above formula:
—$(C_2H_4O)_m(C_3H_6O)_mCOOCH(CH_3)_2$
[m=1-10, x=2-12]

These polycarbonates represented by the above formula [I] can be prepared, for example, by a process mentioned below.

As starting materials, (a) polyol and (b) a carbonate compound, both described below, are used.

(a) polyol represented by the following formula [III]:

$$R_9O-]CH_2CH(OR_9)CH_2O]_x-R_9 \qquad III$$

wherein $R_9$ is a group represented by the following formula (B), and x is an integer of 2 to 30.

$$-(ZO)_mH \qquad (B)$$

wherein Z and m have the same meanings as defined in the aforementioned formula (A).

(b) a carbonate compound represented by the following formula [IV]:

$$R_{10}OCOOR_{10} \qquad IV$$

wherein $R_{10}$ corresponds to the aforesaid $R_2$ and is each independently a hydrocarbon group having not more than 30 carbon atoms or a hydrocarbon group containing an ether linkage and having 2 to 30 carbon atoms, $R_{10}OH$ formed during the reaction of said carbonate compound and the above polyol being lower in boiling point than that of the polyol, and said carbonate compound being used in such an amount that the molar ratio of this carbonate compound to the polyol of the above formula [III] is in the range of 2 to 200.

At first, a mixture of the above-described polyol (a) and carbonate compound (b) is allowed to undergo reaction in the presence of a basic catalyst while heating to distill off alcohol ($R_{10}OH$) formed in the course of the reaction from the reaction system so that the reaction proceeds to a reaction ratio of not less than 95%. In conducting the reaction, it is desirable that air in the reactor is replaced with nitrogen, though this replacement with nitrogen is not essential.

Subsequently, the basic catalyst is removed from the reaction product, and then the unreacted carbonate compound is distilled off from the reaction system to obtain the polycarbonate represented by the aforementioned formula [I].

In the process as described above, there is a possibility of formation of polycarbonates obtained by carbonation of parts of the hydroxyl groups of the starting polyol in a small amount in addition to polycarbonate obtained by carbonation of all the hMdroxyl groups of the polyol.

In the polyol represented by the formula [III], the group represented by the above formula (B) is classified into the following three kinds.

(1) —$(C_3H_6O)_s(C_2H_4O)_tH$
[s+t is an integer of 1 to 24.]

(2) —$(C_2H_4O)_t(C_3H_6O)_sH$
[s+t is an integer of 1 to 24.]

(3) a group in which —$C_2H_4O$— group or —$C_3H_6O$— group is linked to a group obtained by linking —$C_2H_4O$— group and —$C_3H_6O$— group at random and a total number of the —$C_2H_4O$— group and the —$C_3H_6O$— group is 3 to 24.

In the invention, with respect to the above-mentioned each groups (1) to (3), when the number (t) of the —$C_2H_4O$— group is not 0, a ratio (s/t) of the number (s) of the —$C_3H_6O$— group to the number (t) of the —$C_2H_4O$— group is generally in the range of 0.5 to 20, preferably 1 to 10, more preferably 2 to 6. Further, when the number (t) of the —$C_2H_4O$— group is 0, the number (s) of the —$C_3H_6O$— group is generally in the range of 1 to 24, preferably 1 to 12, more preferably 2 to 8.

Concrete examples of the polyols represented by the formula [III] are given below.

(1) $R_9O$—$[CH_2CH(OR_9)CH_2O]_x$—$R_9$
$R_9$ in the above formula:
—$[CH_2CH(CH_3)O]_m$—$H$ [m=1-24, x=2-12]

(2) $R_9O$—$[CH_2CH(OR_9)CH_2O]_x$—$R_9$
$R_9$ in the above formula:
—$[CH_2CH_2O]_m$—$H$
[m=1-24, x=2-12]

(3) $R_9O$—$[CH_2CH(OR_9)CH_2O]_x$—$R_9$
$R_9$ in the above formula:
—$(CH_2CH_2O)_t[CH_2CH(CH_3)O]_s$—$H$ [t+s=1-24, s=2-12]

(4) $R_9O$—$[CH_2CH(OR_9)CH_2O]_x$—$R_9$
$R_9$ in the above formla:
—$[CH_2CH(CH_3)O]_s(C_2H_4O)_t$—$H$
[t+s=1-24, x=2-12]

Concrete examples of the carbonate compounds represented by the above formula [IV] which are preferably used include dimethyl carbonate, diethyl carbonate, dipropyl carbonate, diisopropyl carbonate, dibutyl carbonate, diisobutyl carbonate, diisoamyl carbonate, dihexyl carbonate, dioctyl carbonate, dicylhexyl carbonate, di-2-ethylhexyl carbonate and di (2-methylmethoxyethyl)carbonate.

In the above-described process, the carbonation reaction is allowed to proceed while distilling off alcohol formed in this reaction from the reaction system, and hence hus formed alcohol, namely alcohol represented by the formula $R_{10}OH$, must have a boiling point lower than that of the above-mentioned polyol.

Further, the carbonate compound is used in such an amount that the molar ratio of the carbonate compound to the polyol represented by the formula [III] is in the range of 2 to 200, preferably 3 to 80, more preferably 3 to 50. By using this limited amount of the carbonate compound, production of polycarbonate having high polymerization degree can be inhibited.

In the process mentioned above, the polyol and the carbonate compound having been fed into the reactor are reacted with each other in the presence of a basic catalyst while heating to distill off alcohol formed during the reaction from the reaction system so that the reaction proceeds to a conversion (a reaction ratio) of not less than 95% then the basic catalyst is removed from the reaction mixture, and thereafter the unreacted product is distilled off from the reaction system. By the expression the reaction proceeds to a conversion of not less than 95%" used herein is meant that the reaction is continued until alcohol is formed in an amount by mol of not less than 0.95 times the product of the number of moles of the polyol represented by the formula [III] and the sum of the hydroxyl groups thereof.

Examples of the basic catalyst preferably used in this process include alkali metal hydroxides such as sodium hydroxide and potassium hydroxide; alkali metal carbonates and hydrogen carbonates such as sodium carbonate and sodium hydrogen carbonate; alkali metal alcoholates such as sodium methoxide, potassium methoxide, lithium methoxide and cesium methoxide; and alkali metal compounds such as sodium hydride and sodium amide. Of these, alkali metal alcoholates are particularly preferred. In addition thereto, also employable are alkaline earth metal compounds such as magnesium hydroxide and calcium hydroxide; and organic amino compounds such as trimethylamine, triethylamine, imidazole and tetramethylammonium hydroxide. The catalyst is used in such an amount that a molar ratio of the catalyst to the polyol is usually in the range of $10^{-1}$ to 10hu -7, preferably $10^{-1}$ to $10^{-5}$.

In this process, the reaction is carried out at a temperature of usually 50 to 300° C., preferably 60 to 200° C. and the reaction time is usually 0.5 to 200 hours, preferably 1 to 100 hours.

Removal of the catalyst after completion of the reaction is conducted by washing the reaction product with water or by neutralizing it with acid. The acid used herein includes solid acids such as sulfonic acid type ion exchange resins; inorganic acids such as carbonic acid, ammonium chloride, hydrochloric acid, sulfuric acid and phosphoric acid; and organic acids such as acetic acid and phenol. In conducting the water washing as mentioned above, salts such as ammonium carbonate may be added to the water.

According to this process, as described above, the unreacted carbonate compound is distilled off under a reduced pressure after the removal of the basic catalyst, whereby polymerization of polycarbonate formed during the distillation of the unreacted carbonate compound in the presence of the basic catalyst can be inhibited, and hence the desired polycarbonate can be obtained in a high yield.

The polycarbonate thus obtained may be treated with an adsorbent such as activated clay or activated carbon or may be washed with water, if necessary, to remove a trace amount of impurities. In particular, since a trace amount of ionic or polar compounds can be removed by such treatment as mentioned above, the resulting polycarbonate can be stored stably.

When dimethyl carbonate is used as the carbonate compound in the reaction of the above-mentioned process, an azeotrope former such as cyclohexane, benzene or hexane may be added to the reaction system before initiation of the reaction, whereby methanol produced can be removed from the reaction system as an azeotropic mixture with the azeotrope former, instead of removing methanol as an azeotropic mixture with dimethyl carbonate from the reaction system. The azeotrope former is usually used in an amount of 5 to 100 parts by weight based on 100 parts by weight of dimethyl carbonate.

According to the procedure mentioned above, methanol is removed during the course of the reaction as an azeotropic mixture with the above-mentioned azeotrope former from the reaction system, and the unreacted dimethyl carbonate is recovered from the reaction mixture after completion of the reaction. Hence, the recovery of the unreacted dimethyl carbonate can be effectively recovered.

There is another procedure wherein methanol is recovered as an azeotropic mixture with dimethyl carbonate as described above, then the above-mentioned azeotrope former is added to the recovered azeotropic mixture, and methanol is removed as an azeotropic mixture with said azeotrope former from dimethyl carbonate. Thus, dimethyl carbonate can be recovered.

According to the procedure mentioned above, the desired polycarbonate can be obtained in a high yield, because the basic catalyst used is removed from the reaction product after completion of the reaction of the polyol with the carbonate compound and then the unreacted carbonate compound is removed.

Further, the polycarbonate represented by the formula [I] can be also prepared by the following process.

As starting materials, (a) a polyol, (b) a monoalcohol and (c) a carbonate compound, described below, are used.

(a) a polyol represented by the aforesaid formula [III]

(b) a monoalcohol represented by the following formula [IV]:

$$R_{11}OH \qquad V$$

wherein $R_{11}$ corresponds to the aforesaid $R_2$ and is a hydrocarbon group having not more than 30 carbon atoms or a hydrocarbon group containing an ether linkage and having 2 to 30 carbon atoms.

(c) a carbonate compound represented by the following formula [VI]:

$$R_{12}OCOOR_{12} \qquad VI$$

wherein $R_{12}$ is each independently an alkyl group having 1 to 2 carbon atoms, a boiling point of $R_{12}OH$ formed during the reaction of said carbonate compound with the above polyol and monoalcohol is lower than those of the polyol and monoalcohol, and said carbonate compound being used in such an amount that the molar ratio of this carbonate compound to the polyol represented by the above formula [III] is in the range of 2 to 200.

At first, a mixture of the above-described polyol (a), monoalcohol (b) and carbonate compound (c) is allowed to undergo reaction in the presence of a basic catalyst while heating to distill off alcohol ($R_{12}OH$) formed in the course of the reaction from the reaction system so that the reaction proceeds to a conversion (a reaction ratio) of not less than 95%. In conducting the reaction, it is desirable that air in the reactor is replaced with nitrogen, though this replacement with nitrogen is not essential.

Subsequently, the basic catalyst is removed from the reaction product, and then the unreacted carbonate compound is distilled off from the reaction system to obtain the polycarbonate represented by the aforementioned formula [I].

Even in this process as illustrated above, there is still a possibility of formation of polycarbonates obtained by carbonation of parts of the hydroxyl groups of the starting polyol in a small amount in addition to polycarbonate obtained by carbonation of all the hydroxyl groups of this polyol.

In this process, the carbonation reaction is allowed to proceed while distilling off alcohol formed in this reaction from the reaction system, and hence thus formed alcohol, namely alcohol represented by the formula $R_{12}OH$, must have a boiling point lower than those of the above-mentioned polyol and monoalcohol.

Further, the carbonate compound is used in such an amount that a molar ratio of the carbonate compound to the polyol represented by the formula [III] is in the range of 2 to 200, preferably 3 to 80, more preferably 3 to 50. By using this limited amount of the carbonate compound, production of polycarbonate having high polymerization degree can be inhibited.

In the process mentioned above, the polyol, the monoalcohol and the carbonate compound having been fed into the reactor are reacted with each other in the presence of a basic catalyst while heating to distill off alcohol formed during the reaction from the reaction system so that the reaction proceeds to a conversion (a reaction ratio) of not less than 95%, then the basic catalyst is removed from the reaction mixture, and thereafter the unreacted carbonate compound is distilled off from the reaction system.

By the expression "the reaction proceeds to a conversion of not less than 95%" used herein is meant that the reaction is continued until alcohol is formed in an amount by mol of not less than 0.95 times the product of the number of moles of the polyol represented by the formula [III] and the sum of the hydroxyl groups thereof.

With respect to the basic catalyst, reaction temperature, reaction time, removal of the catalyst after completion of the reaction, removal of impurities from the final product and recovery of the unreacted dimethyl carbonate, this process is carried out in the same manner as in the process previously mentioned.

In the process just described above, the aimed polycarbonate can be prepared by using easily available carbonate compounds represented by the formula [VI] (e.g., dimethyl carbonate, diethyl carbonate and ethylmethyl carbonate), and hence this process is economical.

Further, according to this process, the aimed polycarbonate can be obtained in a high yield, similarly to the case of the process previously mentioned.

A first lubricating oil of the present invention comprises the polycarbonate represented by the aforesaid formula [I].

A second lubricating oil of the present invention further comprises a polycarbonate represented by the following formula [II] and the polycarbonate represented by the aforesaid formula [I].

The polycarbonate represented by the following formula [II] has —$C_2H_4O$— group and/or —$CH_2CH(CH_3)O$— group in its main chain.

$$R_3OCOO[(R_4O)_pCOO]_nR_3 \qquad II$$

wherein $R_3$ is each independently a hydrocarbon group having 1 to 10 carbon atoms or a glycol ether group represented by the following formula:

$$R_5(OR_6)_y-$$

wherein $R_5$ is a hydrocarbon group having 1 to 10 carbon atoms, $R_6$ is an ethylene group or a propylene group, and y is an integer of 1 to 10.

Concrete examples of the hydrocarbon group having 1 to 10 carbon atoms which is indicated by $R_3$ include methyl group, ethyl group, propyl group, isopropyl group, isobutyl group, s-butyl group, t-butyl group, pentyl group, isopentyl group, neopentyl group, n-hexyl group, isohexyl group, cyclohexyl group and phenyl group.

As concrete examples of the hydrocarbon group having 1 to 10 carbon atoms which is indicated by $R_5$ in the above formula representing the glycol ether group, there can be mentioned those concretely exemplified with respect to the hydrocarbon group indicated by $R_3$.

In the formula [II], $R_4$ is an alkylene group having 2 to 20 carbon atoms, p is an integer of 1 to 100, and n is an integer of 1 to 10.

The polycarbonates represented by the above formula [II] sometimes exist in the form of a mixture of several kinds of polycarbonates each represented by the formula [II] which differ from each other in the n value, and in this case, n is expressed by an average value and does not take an integer. In this case, a polycarbonate represented by the formula [II] wherein n is 0, 1 or not less than 11 may be contained in the mixture of polycarbonates each represented by the formula [II] in such an amount that the objects of the invention can be accomplished without hindrance.

Examples of the polycarbonates represented by the formula [II] are given below.

(1) $CH_3OCOO[(C_2H_4O)_pCOO]_nCH_3$ [n=1-10, p=1-60]
(2) $C_2H_5OCOO[(C_2H_4O)_pCOO]_nC_2H_5$ [n=1-10, p=1-60]
(3) $C_3H_7OCOO[(C_2H_4O)_pCOO]_nC_3H_7$ [n=1-10, p=1-60]
(4) $C_4H_9OCOO[(C_2H_4O)_pCOO]_nC_4H_9$ [n=1-10, p=1-60]
(5) $CH_3OCOO[(CH_2CH(CH_3)O)_pCOO]_nCH_3$ [n=1-10, p=1-60]
(6) $C_2H_5OCOO[(CH_2CH(CH_3)O)_pCOO]_nC_2H_5$ [n=1-10, p=1-60]
(7) $C_3H_7OCOO[(CH_2CH(CH_3)O)_pCOO]_nC_3H_7$ [n=1-10, p=1-60]
(8) $C_4H_9OCOO[(CH_2CH(CH_3)O)_pCOO]_nC_4H_9$ [n=1-10, p=1-60]
9) $C_5H_{11}OCOO[(CH_2CH(CH_3)O)_pCOO]_nC_5H_{11}$ [n=1-10, p=1-60]
(10) $C_3H_7OCOO[(C_2H_4O)_y(CH_2CH(CH_3)O)_zCOO]_nC_3H_7$ [n=1-10, y+z=1-60]
(11) $CH_3OCOO[(C_2H_4O)_y(CH_2CH(CH_3)O)_zCOO]_nCH_3$ [n=1-10, y+z=1-60]
(12) $C_5H_{11}OCOO[C_5H_{10}OCOO]_nC_5H_{11}$ [n=1-10]
(13) $C_8H_{17}OCOO[C_5H_{10}OCOO]_nC_8H_{17}$ [n=1-10]
(14) $C_5H_{11}OCOO[C_6H_{12}OCOO]_nC_5H_{11}$ [n=1-10]
(15) $C_7H_{15}OCOO[C_6H_{12}OCOO]_nC_7H_{15}$ [n=1-10]
(16) $C_5H_{11}OCOO[C_9H_{18}OCOO]_nC_5H_{11}$ [n=1-10]

These polycarbonates represented by the formula [II] can be prepared, for example, by a process mentioned below. As starting materials, (a) a polyol and (b) a carbonate compound, both described below, are used.

(a) a polyol represented by the formula [VII]:

$$HO(R_4O)]_pH \qquad \text{VII}$$

wherein p is the same as p in the aforesaid formula [II].

(b) a carbonate compound represented by the formula [VIII]:

$$R_{10}OCOOR_{10} \qquad \text{VIII}$$

wherein $R_{10}$ corresponds to the aforesaid $R_2$ and is each independently a hydrocarbon group having not more than 30 carbon atoms or a hydrocarbon group containing an ether linkage and having 2 to 30 carbon atoms, $R_{10}OH$ formed during the reaction of said carbonate compound with the above polyol being lower in boiling point than that of the polyol, and said carbonate compound being used in such an amount that a molar ratio of this carbonate compound to the polyol represented by the above formula [VII] is in the range of 2 to 200.

At first, a mixture of the above-described polyol (a) and carbonate compound (b) is allowed to undergo reaction 0 in the presence of a basic catalyst while heating to distill off alcohol ($R_{10}OH$) formed in the course of the reaction from the reaction system so that the reaction proceeds to a conversion (a reaction ratio) of not less than 95%. In conducting the reaction, it is desirable that air in the reactor is replaced with nitrogen, though this replacement with nitrogen is not essential.

Subsequently, the basic catalyst is removed from the reaction mixture, and then the unreacted carbonate compound is distilled off from the reaction system to obtain the polycarbonate represented by the aforementioned formula [II].

The polycarbonates represented by the formula [II] may be prepared in other processes than the above-described process. For example, at least one of monoalcohol compounds represented by the following formula [IX] and at least one of oxyalkylene glycol compounds represented by the following formula IX] are subjected to ester interchange in the presence of excess carbonic ester.

$$R_3-OH \qquad \text{IX}$$

wherein $R_3$ is the same as $R_3$ in the aforesaid formula [II].

$$HO(R_4O)_pH \qquad \text{X}$$

wherein $R_4$ and p are the same as $R_4$ and p in the aforesaid formula [II], respectively.

In such a process for preparing the polycarbonates represented by the formula [II] as mentioned above, the average molecular weight of the resulting polycarbonate can be easily controlled by appropriately selecting the oxyalkylene glycol compound and the monoalcohol compound and also selecting the molar ratio therebetween. Accordingly, any viscosity of polycarbonate within a wide range requested depending on purpose can be easily obtained by the process for preparing polycarbonates as mentioned above.

Further, according to the process for preparing the polycarbonates represented by the formula [II] as mentioned above, carbonic ester linkage is formed by transesterification in the presence of excess carbonic ester of alcohol having a relatively low boiling point, so that any of such poisonous gases as phosgene is not used, and hence this process is advantageous in view of safety.

The first lubricating oil of the invention comprises the polycarbonate represented by the formula [I], as described above. The second lubricating oil of the invention is prepared by mixing the polycarbonate represented by the formula [I] and the polycarbonate represented by the formula [II].

Namely, the second lubricating oil may be prepared by mixing the polycarbonate represented by the formula [I] and the polycarbonate represented by the formula [II] which are separately prepared by the aforementioned processes.

Further, it is also possible to prepare the second lubricating oil by mixing the polyol represented by the formula [III] and the polyol represented by the formula [VII] and then the resulting mixture is carbonated in the manner mentioned before.

In the second lubricating oil of the invention, the ratio between the polycarbonate represented by the formula [I] and the polycarbonate represented by the formula [II] is appropriately determined depending on the concrete purpose of the lubricating oil.

In the lubricating oil comprising the polycarbonate represented by the formula [I] and the polycarbonate represented by the formula [II], the ratio [PC-I/PC-II] of the polycarbonate represented by the formula [I] (PC-I) to the polycarbonate represented by the formula [II] (PC-II) is usually in the range of 98/2 to 5/95, preferably 95/5 to 10/90, more preferably 90/10 to 15/85.

The polycarbonate represented by the formula [I], the polycarbonate represented by the formula [II] and a mixture thereof are all excellent in lubricating properties, low in hygroscopicity and high in detergency, as compared with glycol ethers, and therefore they can be used as lubricating oils for refrigerators such as automotive airconditioner and electric refrigerator, industrial gear oils, automotive engine oils, automotive gear oils, lubricating oils for rolling and lubricating oils for fibers.

Further, the polycarbonate represented by the formula [I], the polycarbonate represented by the formula [II] and a mixture thereof are all excellent not only in lubricating properties and detergency but also in compatibility wiLh ozone layer-nondestructive hydrogenated fluorocarbon (HFC) such as R-134a, hydrogenated chlorofluorocarbon (HCFC) having small ozone depletion potential such as R-22 and a mixture thereof, though they are high in viscosity. Moreover, these polycarbonates are also excellent in compatibility with chlorofluorocarbon (CFC) having large ozone depletion potential such as R-12.

Accordingly, the polycarbonate represented by the formula [I], the polycarbonate represented by the formula [II] and a mixture thereof can be utilized particularly as lubricating oils for refrigerators wherein the abcvementioned ozone layer-nondestructive hydrogenated fluorocarbon is used as a refrigerant and such a highviscosity lubricating oil as used in an automotive roLary air-conditioner is used.

The lubricating oils of the invention which are employable as those for refrigerators may contain other components in addition to the polycarbonate represented by the formula [I] and the polycarbonate represented by the formula [II].

Examples of the components which may be contained in the lubricating oils of the invention other than the polycarbonates represented by the formulas [I] and [II] include oligomers of these polycarbonates which are by-products produced during the process for preparing these polycarbonates, glycol ethers such as polyether glycol of random copolymer composed of ethylene oxide and propylene oxide, and mineral oils such as neutral oil and bright stock. Further, -olefin oligomers such as liquid 5 polybutene oligomer and liquid decene oligomer, carboxylic esters such as diisooctyl adipate, diisooctyl sebacate and dilauryl sebacate, and vegetable oils may also be contained in the lubricating oils. Especially in the case of lubricating oils for refrigerators wherein HFC such as R-134a is used as an ozone layer-nondestructive refrigerant gas, the components employable for the lubricating oils other than the above-mentioned polycarbonates are limited to glycol ethers and carboxylic esters in view of the compatibility. However, the amounts of these components tc be added are required to be less than 60% by weight based on 100% by weight of the total amount of the lubricating oil, because addition of these components in large amounts deteriorates heat resistance, compatibility with R-134a and water absorption of the resulting lubricating oil.

Moreover, the lubricating oils for refrigerators according to the invention may also contain phenol stabilizers, anti-foaming agents, and epoxy compounds serving as chlorine complementary agents against inclusion of chlorine refrigerants into the lubricating oils.

Furthermore, in the present invention, the lubricating oils for refrigerators may contain known additives for lubricating oils, for example, detergent-dispersants, antioxidants, anti-load agents, oiliness improvers and pour point depressants as described in Toshio Sakurai, "Additives for Petroleum Products", Saiwai Shobo, 1974, in such an amount that the objects of the invention can be accomplished without hindrance.

Still further, the lubricating oils for refrigerators may also contain ozone layer-nondestructive hydrogenated fluorocarbons (HFC) such as R-134a, hydrogenated chlorofluorocarbons (HCFC) having small ozone depletion potential such as R-22 and mixtures thereof.

EFFECT OF THE INVENTION

The polycarbonates used the invention, that is, the polycarbonate represented by the formula [I] and the polycarbonate represented by the formula [II], are excellent in lubricating properties, low hygroscopicity and high detergency as compared with glycol ethers.

Accordingly, the lubricating oils comprising these polycarbonates can be used as lubricating oils for refrigerators such as air-conditioner and electric refrigerator, industrial gear oils, automotive engine oils, automotive gear oils, lubricating oils for rolling and lubricating oils for fibers.

The polycarbonates represented by the formulas [I] and [II] are excellent not only in lubricating properties and detergency but also in compatibility with ozone layer-nondestructive HFC such as R-134a, HCFC having small ozone depletion potential such as R-22, and mixtures thereof, though they are high in viscosity. Further, these polycarbonates are also excellent in compatibility with CFC having large ozone depletion potential such as R-12. Accordingly, the lubricating oils of the invention are suitable as those for refrigerators wherein a high-viscosity lubricating oil is used, such as an automotive rotary air-conditioner. Especially when used for refrigerators wherein the above-mentioned ozone layer-nondestructive HFC is used as a refrigerant, they exhibit high compatibility with HFC and excellent lubricating performance on metal (e.g., iron or aluminum) surface of the device used.

The present invention is illustrated below with reference to examples, but it should be construed that the invention is in no way limited to those examples. In the following examples, analysis of polycarbonates and evaluation of performance of lubricating oils were carried out in accordance with the following test methods.

(1) Analytical method a. Average molecular weight

Using a GPC system of Shimadzu Seisakusho Ltd., an average molecular weight of the polycarbonate obtained was determined on the basis of polystyrene. The conditions under which the average molecular weight was determined are as follows.

Column: Four pices of polystyrene gel (G-2000HXL+G-2000HXL+G-3000HXL+G4000HXL)

Sensor: Differential refractometer

Temperature: 40° C.

Solvent: Tetrahydrofuran

Rate of elution: 0.7 ml/min (2) Evaluation method a. Kinematic viscosity JIS K-2283 b. Viscosity index JIS K-2283 c. Load bearing capacity

After a 5-minute warming-up operation under a load of 250 lbf using a Falex tester, the load is continuously increased, and a value of the increased load obtained, at which burn marks have appeared, is taken as a value of load bearing capacity.

d. Compatibility with R-134a

In order to investigate a compatibility of the carbonate product with R-134a in detail, a lubricating oil and R-134a are introduced in various proportions into a glass tube to obtain a critical temperature at which the two compounds become compatible with each other.

Example 1

In a 3-liter flask equipped with a distillation column of a 10-sieve tray were charged 401 g of a propylene oxide 30-molecule adduct of polyglycerol [trade name of said adduct: REPOLH-220, available from Toho Kagaku Kogyo K.K., average molecular weight of said adduct: 2,158, trade name of said polyglycerol: PGL-06, available from Daisel Kagaku Kogyo K.K., average molecular weight of said polyglycerol: 462], 1,361 g of diisopropyl carbonate (DIPC) and 2.0 g of a methanol solution of 28% by weight of $NaOCH_3$.

The resulting mixture was heated to a temperature of 125 to 150° C. at an atmospheric pressure to carry out reaction while distilling off isopropanol formed during the reaction, whereby the effusion of the isopropanol ceased after 3.5 hours. The amount of the isopropanol formed was 91 g, and the yield of the isopropanol was about 100%.

To the reaction mixture thus obtained was added hexane, and treated with an aqueous solution containing ammonium carbonate in an amount by mol of five times the amount of the $NaOCH_3$ used. Thus treated reaction mixture was repeatedly washed with water, and then the hexane and the unreacted DIPC were distilled off from the reaction system to obtain 505 g of polycarbonate.

The polycarbonate thus obtained was a viscous liquid. From the results of $^1$H-NMR, infrared absorption spectrum analysis and GPC analysis, it was found that this polycarbonate has the following structure.

$R_1O-[CH_2CH(OR_1)CH_2]_x-OR_1$ $R_1$ in the above formula: $-(C_3H_6O)_m-COOCH(CH_3)_2$ x=4–8, average x value=6 m=3–5, average m value=3.8

The polycarbonate obtained as above was analyzed by means of $^1$H-NMR, whereby such peaks as mentioned below appeared in the chart. In this analysis, $CDCl_3$ was used as a solvent.

1.07–1.15 ppm
1.22–1.35 ppm
3.25–3.65 ppm
4.77–4.88 ppm

The infrared absorption spectrum of the obtained polycarbonate is shown in FIG. 1. The main peaks of the infrared absorption spectrum are as follows.

| | |
|---|---|
| νC—H | 2800–3100 cm$^{-1}$ |
| δC—H | 1450 cm$^{-1}$ |
| νC=O | 1740 cm$^{-1}$ |
| νC—O | 1260 cm$^{-1}$ |
| νC—O—C | 1100 cm$^{-1}$ |

Further, the results obtained by the GPC analysis of the polycarbonate are given below. In this analysis, it was confirmed a presence of a polycarbonate partial condensate in the product.

Weight-average molecular weight (Mw)/number-average molecular weight (Mn):1.41

Weight-average molecular weight (Mw) measured by the polystyrene conversion method:4,548

Amount of sodium remaining in the product: not more than 0.01 ppm

Total acid value in the product: not more than 0.01

The results of evaluation of the polycarbonate on the fundamental performance as lubricating oil are set forth in Table 1.

Example 2

The procedure of Example 1 was repeated except for varying the amounts of the polyglycerol-propylene oxide 30-molecule adduct [average molecular weight: 2,158], DIPC and the methanol solution of 28% by weight of $NaOCH_3$ to 300 g, 1,227 g and 1,9 g, respectively, to obtain 366 g of polycarbonate.

The polycarbonate thus obtained was a viscous liquid, and the results of $^1$H-NMR, infrared absorption spectrum analysis and GPC analysis were exactly the same as those obtained in Example 1. Accordingly, it was confirmed that the structure of the polycarbonate obtained in the above was identical with that of the polycarbonate obtained in Example 1.

The results obtained by the GPC analysis of the polycarbonate are given below. In this analysis, it was confirmed a presence of a polycarbonate partial condensate in the product.

Weight-average molecular weight (Mw)/number-average molecular weight (Mn):1.34

Weight-average molecular weight (Mw) measured by the polystyrene conversion method: 4,264

Amount of sodium remaining in the product: not more than 0.01 ppm

Total acid value in the product: not more than 0.01

The results of evaluation of the polycarbonate on the fundamental performance as lubricating oil are set forth in Table 1.

Example 3

The procedure of Example 1 was repeated except for using 300 g of a propylene oxide 30-molecule adduct of polyglycerol [trade name of said adduct: REPOL L-210P, available from Toho Kagaku Kogyo K.K., average molecular weight of said adduct: 2,440, trade name of said polyglycerol: PGL-10, available from Daisel Kagaku Kogyc K.K., average molecular weight of said polyglycerol: 792] instead of 401 g of the polyglycerol-propylene oxide 30-molecule adduct, and the amounts of the DIPC and the methanol solution of 28% by weight of $NaOCH_3$ to 1,095 g and 1,2 g, respectively, to obtain 401 g of polycarbonate.

The polycarbonate thus obtained was a viscous liquid, and from the results of $^1$H-NMR, infrared absorption spectrum analysis and GPC analysis, it was found that the polycarbonate has the following structure.

$R_1O-[CH_2CH(OR_1)CH_2]_x-OR_1$ $R_1$ in the above formula: $(C_3H_6O)_m COOCH(CH_3)_2$
x=8–12, average x value=10
m=2–3, average m value =2.5

Figure 2:
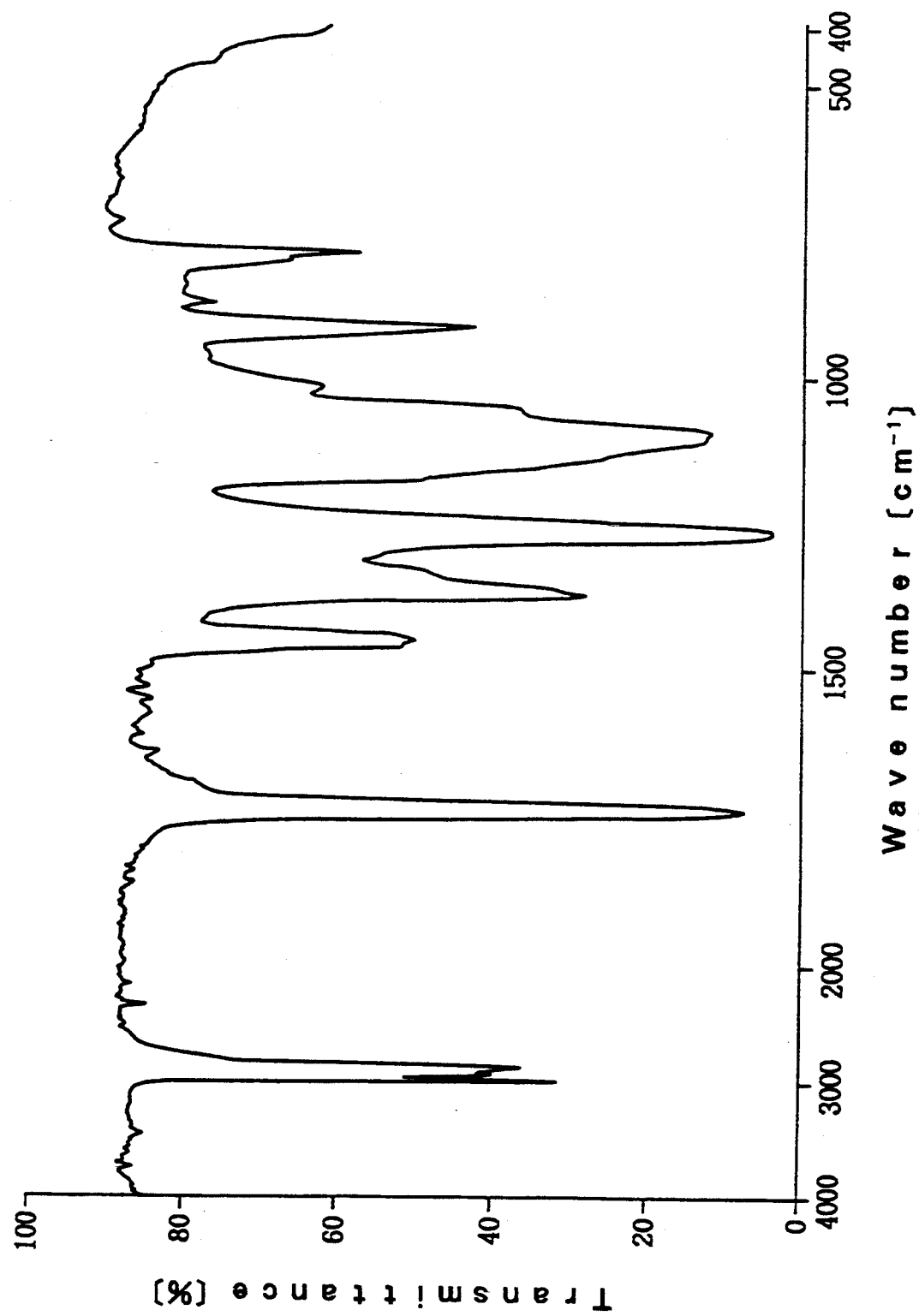
FIG. 2 is a view showing an infrared absorption spectrum of polycarbonate obtained in Example 3.

The polycarbonate obtained as above was analyzed by means of $^1$H-NMR, whereby such peaks as mentioned below appeared in the chart. In this analysis, CDCl$_3$ was used as a solvent.
1.07–1.18 ppm
1.22–1.30 ppm
3.27–3.63 ppm
4.78–4.88 ppm Further, the infrared absorption spectrum of the obtained polycarbonate is shown in FIG. 2. The main peaks of the infrared absorption spectrum are as follows.

| | |
|---|---|
| $\nu$C—H | 2800–3100 cm$^{-1}$ |
| $\delta$C—H | 1450 cm$^{-1}$ |
| $\nu$C=O | 1740 cm$^{-1}$ |
| $\nu$C—O | 1260 cm$^{-1}$ |
| $\nu$C—O—C | 1100 cm$^{-1}$ |

The results obtained by the GPC analysis of the polycarbonate are given below. In this analysis, it was confirmed a presence of a polycarbonate partial condensate in the product.

Weight-average molecular weight (Mw)/number-average molecular weight (Mn):1.54

Weight-average molecular weight (Mw) measured by the polystyrene conversion method:5,159

Amount of sodium remaining in the product: not more than 0.01 ppm

Total acid value in the product: not more than 0.01

The results of evaluation of the polycarbonate on the fundamental performance as lubricating oil are set forth in Table 1.

Example 4

The procedure of Example 3 was repeated except for varying the amounts of the polyglycerol-propylene oxide 30molecule adduct [average molecular weight: 2,440], DIPC and the methanol solution of 28% by weight of NaOCH$_3$ to 400 g, 1,199 g and 1,8 g, respectively, to obtain 513 g of polycarbonate.

The polycarbonate thus obtained was a viscous liquid, and the results of $^1$H-NMR, infrared absorption spectrum analysis and GPC analysis were exactly the same as those obtained in Example 3. Accordingly, it was confirmed that the structure of this polycarbonate was identical with that of the polycarbonate obtained in Example 3.

Further, the results obtained by the GPC analysis of this polycarbonate are given below. In this analysis, it was confirmed a presence of a polycarbonate partial condensate in the obtained.

Weight-average molecular weight (Mw)/number-average molecular weight (Mn):1.67

Weight-average molecular weight (Mw) measured by the polystyrene conversion method:6,196

Amount of sodium remaining in the product: not more than 0.01 ppm

Total acid value in the product: not more than 0.01

The results of evaluation of the polycarbonate on the fundamental performance as lubricating oil are set forth in Table 1.

TABLE 1

| | Ex. 1 | Ex. 2 | Ex. 3 | Ex. 4 |
|---|---|---|---|---|
| Viscosity characteristics | | | | |
| 100° C. Kinematic viscosity (cSt) | 36.9 | 34.6 | 61.2 | 73.5 |
| 40° C. Kinematic viscosity (cSt) | 432.2 | 402.9 | 1069 | 1320 |
| Viscosity index | 128 | 126 | 113 | 119 |
| Load bearing capacity [lbf] | 900 | 890 | 920 | 940 |
| Compatibility with R-134a | | | | |
| (1) (Note 1) | ○ | ○ | ○ | ○ |
| (2) Critical temperature [°C.] (Note 2) | | | | |
| High-temperature side | 64 | 67 | 65 | 57 |
| Low-temperature side | ≦−65 | ≦−65 | ≦−65 | ≦−65 |

(Note 1)
○: compatible
x: not compatible
(Note 2)
Lubricating oil: 15%
R-134a: 85%

Referential Example 1

In a 3-liter flask equipped with a distillation column of a 10-sieve tray were charged 1,000 g of polypropylene glycol having an average molecular weight of 1,011 (trade name: PPG Diol, available from Mitsui Toatsu Chem. Inc.], 3,650 g of diisopropyl carbonate (DIPC) and 3.90 g of a methanol solution of 28% by weight of NaOCH$_3$.

The resulting mixture was heated to a temperature of to 150° C. at an atmospheric pressure to carry out reaction for 7.5 hours. To the reaction mixture thus obtained was added water to remove the catalyst, and then the unreacted DIPC was distilled off from the reaction system to obtain 1,141 g of polycarbonate.

As a result of the GPC analysis of the polycarbonate thus obtained, it was found that the polycarbonate has a composition comprising 90.2% of monomer and 9.8% of polymer (dimer: 7.0%, terpolymer: 2.8%). From the results obtained by the GPC analysis, it was also found that the polycarbonate has the following structure.

$(CH_3)_2CHOCOO[(C_3H_6O)_pCOO]_nCH(CH_3)_2$
n=1–2, average n value =1.2
p=16–18, average p value=17

The results of evaluation of the polycarbonate on the fundamental performance as a lubricating oil are set forth in Table 2.

Referential Examples 2–4

The procedure of Referential Example 1 was repeated except for using, instead of the polypropylene glycol, 700 g of polypropylene glycol having an average molecular weight of 1,200 [trade name: Diol-1200 of PPG DIOL Series, available from Mitsui Toatsu Chem. Inc.], 1,050 g of polypropylene glycol having an average molecular weight of 1,500 [trade name: Diol-1500 of PPG DIOL Series, available from Mitsui Toatsu Chem. Inc.] and 938 g of polypropylene glycol having an average molecular weight of 2,000 [trade name: Diol-2000 of PPG DIOL Series, available from Mitsui Toatsu Chem. Inc.], respectively, and using as the starting dicarbonate 2,128 g of DIPC, 1,575 g of dimethyl carbonate (DMC) and 2,067 g of DIPC, respectively, to obtain polycarbonates.

The amounts of the polycarbonates thus obtained were 788 g, 1,051 g and 991 g, respectively. From the results of the GPC analysis, it was found that the obtained polycarbonates have the following structures.

[Polycarbonate obtained in Referential Example 2]

$(CH_3)_2CHOCOO[(C_3H_6O)_pCOO]_nCH(CH_3)_2$
n=1-2, average n value=1.1
p=19-21, average p value=20

Polycarbonate obtained in Referential Example 3]

$(CH_3)_2CHOCOO[(C_3H_6O)_pCOO]_nCH(CH_3)_2$
n=1-2, average n value=1.1
p=25-27, average p value=26

[Polycarbonate obtained in Referential Example 4]

$(CH_3)_2CHOCOO[(C_3H_6)_pCOO]_nCH(CH_3)_2$
n=1-2, average n value=1.1
p=33-35, average p value=34

The results of the GPC composition analysis of these polycarbonates and the evaluation thereof on the fundamental performance as lubricating oil are set forth in Table 2.

Referential Example 5

In a 5-liter flask equipped with a distillation column of a 10-sieve tray were charged 341 g (2.89 mol) of 3-methylpentanediol, 3,573 g (13.85 mol) of di[methylhexyl]carbonate and 1.0 g (0.005 mol) of a methanol solution of 28% by weight of NaOCH$_3$.

The resulting mixture was heated to a temperature of 30 to 160° C. at a reduced pressure (40 to 10 mmHg) to carry out reaction for 10 hours while distilling off methylhexanol formed during the reaction. To the reaction mixture thus obtained was added water to remove the catalyst, and then the unreacted di-[methylhexyl] carbonate was distilled off from the reaction system to obtain 902 g of polycarbonate.

From the results of the GPC analysis, it was found that the polycarbonate thus obtained has the following structure.

$R_3OCOO[(CH_2CH_2CH(CH_3)CH_2CH_2OCOO]_nR_3$
R$_3$:
  3-methylhexyl group ... about 50% by mol
  5-methylhexyl group ... about 50% by mol
n=1-2, average n value=1.4

The results of the GPC composition analysis of this polycarbonate and the evaluation thereof on the fundamental performance as lubricating oil are set forth in Table 2.

Referential Example 6

In a 3-liter flask equipped with a distillation column of a 10-sieve tray were charged 202 g (1.26 mol) of a mixture of nonanediol and 2-methyloctanediol [nonanediol/2-methyloctanediol (by weight)=65/35], 1,284 g (6.35 mol) of di-[isoamyl]carbonate and 2.8 g (0.015 mol) of a methanol solution of 28% by weight of NaOCH$_3$.

The resulting mixture was heated to a temperature of 120 to 140° C. at a reduced pressure (180 to 24 mmHg) to carry out reaction for 6 hours while distilling off isoamyl alcohol formed during the reaction. To the reaction mixture thus obtained was added water to remove the catalyst, and then the unreacted di[isoamyl] carbonate was distilled off from the reaction system to obtain 407 g of polycarbonate.

From the results of the GPC analysis, it was found that the polycarbonate thus obtained has the following structure.

$(CH_3)_2CHCH_2CH_2OCOO[(CH_2)_9OCOO]_nCH_2CH_2CH(CH_3)_2$ ... 65% by mol
$(CH_3)_2CHCH_2CH_2OCOO[CH_2CH(CH_3)(CH_2)_6OCOO]_nCH_2CH_2CH(CH_3)_2$ ... 35% by mol
n=1-2, average n value=1.4

The results of the GPC composition analysis of this polycarbonate and the evaluation thereof on the fundamental performance as lubricating oil are set forth in Table 2.

TABLE 2

| | GPC composition analysis | | 100° C. | | | Compatability Critical temperature with R-134a [°C.] | |
| | | | Viscosity characteristics | | | | |
| Referential Example | mono-mer [%] | poly-mer [%] | Kine-matic viscosity [cSt] | Viscosity index | Load bearing capacity [lbf] | High temperature side | Low temperature side |
|---|---|---|---|---|---|---|---|
| 1 | 90.2 | 9.8 | 12.9 | 163 | 820 | 80 | ≦−65 |
| 2 | 94.6 | 6.0 | 14.9 | 168 | 820 | 79 | ≦−65 |
| 3 | 95.8 | 4.2 | 16.0 | 176 | 840 | 66 | ≦−65 |
| 4 | 94.6 | 5.4 | 26.1 | 195 | 850 | 56 | ≦−65 |
| 5 | 67.7 | 32.3 | 5.5 | 133 | 880 | 94 | −59 |
| 6 | 66.91 | 33.1 | 5.3 | 147 | 800 | 97 | −58 |

(Note) Critical temperature
Lubricating oil: 3%
R-134a: 97%

Example 5

The polycarbonate of Example 1 and the polycarbonate of Referential Example 1 were mixed together in a ratio of 85/15 by weight (polycarbonate of Example 1/polycarbonate of Referential Example 1), to obtain polycarbonate composition of high viscosity having a kinematic viscosity at 100° C. of not less than 20 cSt and a viscosity index of not less than 125 and exhibiting such excellent performance as a lubricating oil. The compatibility of the lubricating oil with R-134a (critical temperature) on the high-temperature side was not lower than 65° C., as shown in Table 3.

Examples 6–17

The polycarbonates of Examples 1 to 4 and the polycarbonates of Referential Examples 1 to 6 were mixed together in ratios set forth in Table 3, to obtain polycarbonate compositions of high viscosity each having a kinematic viscosity at 100° C. of not less than 20 cSt and a viscosity index of not less than 125 and exhibiting such excellent performance as a lubricating oil. The compatibility of the lubricating oil with R-134a (critical temperature) on the high-temperature side was not lower than 65° C., as shown in Table 3.

TABLE 3

| | Component of sample | | Viscosity characteristics | | | Compatability Critical temperature with R-134a [°C.] | |
| | | | 100° C. | | | | |
| Example | Example/Referential Example | Mixing ratio % by weight | Kine-matic viscosity [cSt] | Viscosity index | Load bearing capacity [lbf] | High temperature side | Low temperature side |
|---|---|---|---|---|---|---|---|
| 5 | 1/1 | 85/15 | 32.0 | 132 | 870 | 67 | ≦−65 |

TABLE 3-continued

| Example | Component of sample Example/ Referential Example | Mixing ratio % by weight | Viscosity characteristics 100° C. Kinematic viscosity [cSt] | Viscosity index | Load bearing capacity [lbf] | Compatability Critical temperature with R-134a [°C.] High temperature side | Low temperature side |
|---|---|---|---|---|---|---|---|
| 6  | 1/2 | 75/25 | 30.0 | 138 | 860 | 68 | ≤−65 |
| 7  | 1/1 | 45/55 | 22.0 | 148 | 840 | 73 | ≤−65 |
| 8  | 2/4 | 85/15 | 32.5 | 135 | 870 | 65 | ≤−65 |
| 9  | 2/3 | 40/60 | 22.0 | 151 | 850 | 66 | ≤−65 |
| 10 | 2/2 | 85/15 | 30.5 | 131 | 870 | 69 | ≤−65 |
| 11 | 2/1 | 50/50 | 21.5 | 142 | 850 | 73 | ≤−65 |
| 12 | 3/1 | 60/40 | 32.0 | 134 | 860 | 71 | ≤−65 |
| 13 | 3/2 | 30/70 | 23.0 | 155 | 840 | 75 | ≤−65 |
| 14 | 4/1 | 30/70 | 21.0 | 150 | 840 | 73 | ≤−65 |
| 15 | 4/2 | 50/50 | 32.0 | 143 | 870 | 71 | ≤−65 |
| 16 | 1/5 | 70/30 | 20.0 | 130 | 890 | 72 | ≤−65 |
| 17 | 3/6 | 55/45 | 20.5 | 130 | 870 | 76 | −63 |
| 18 |     |       | 30.5 | 132 | 880 | 68 | ≤−65 |

(Note) Critical temperature
Lubricating oil: 3%
R-134a: 97%

Example 18

The procedure of Example 1 was repeated except for charging 400 g of the polyglycerol/propylene oxide adduct, 70 g of polypropylene glycol having an average molecular weight of 1,011 [trade name: PPG Diol, available from Mitsui Toatsu chem. Ltd.], 1,616 g of DIPC and 3.2 g of a methanol solution of 28% by weight of NaOCH₃, to obtain 590 g of polycarbonate.

The results of evaluation of the polycarbonate thus obtained are set forth in Table 3.

What is claimed is:

1. A polycarbonate represented by the following general formula [I]:

$$R_1O-[CH_2CH(OR_1)CH_2O]_x-R_1 \qquad I$$

wherein $R_1$ is a group represented by the following formula (A), and x is an integer of 2 to 30;

$$-(ZO)_mCOOR_2 \qquad (A)$$

wherein $R_2$ is each independently a hydrocarbon group having not more than 30 carbon atoms or a hydrocarbon group containing an ether linkage and having 2 to 30 carbon atoms, Z is an alkylene group selected from an ethylene group and a propylene group, and m is an integer of 1 to 24.

2. A lubricating oil comprising a polycarbonate represented by the following general formula [I]:

$$R_1O-[CH_2CH(OR_1)CH_2O]_x-R_1 \qquad I$$

wherein $R_1$ is a group represented by the following formula (A), and x is an integer of 2 to 30;

$$-(ZO)_mCOOR_2 \qquad (A)$$

wherein $R_2$ is each independently a hydrocarbon group having not more than 30 carbon atoms or a hydrocarbon group containing an ether linkage and having 2 to 30 carbon atoms, Z is an alkylene group selected from an ethylene group and a propylene group, and m is an integer of 1 to 4.

3. A lubricating oil comprising a polycarbonate represented by the following general formula [I] and a polycarbonate represented by the following general formula [II]:

$$R_1O-[CH_2CH(OR_1)CH_2O]_x-R_1 \qquad I$$

wherein $R_1$ is a group represented by the following formula (A), and x is an integer of 2 to 30;

$$-(ZO)_mCOOR_2 \qquad (A)$$

wherein $R_2$ is each independently a hydrocarbon group having not more than 30 carbon atoms or a hydrocarbon group containing an ether linkage and having 2 to 30 carbon atoms, Z is an alkylene group selected from an ethylene group and a propylene group, and m is an integer of 1 to 24;

$$R_3OCOO[(R_4O)_pCOO]_nR_3 \qquad II$$

wherein $R_3$ is a hydrocarbon group having 1 to 10 carbon atoms or a glycol ether group represented by the formula $R_5(OR_6)_y-$ wherein $R_5$ is a hydrocarbon group having 1 to 10 carbon atoms, $R_6$ is an ethylene group or a propylene group, and y is an integer of 1 to 10; $R_4$ is an alkylene group having 2 to 20 carbon atoms; p is an integer of 1 to 100; and n is an integer of 1 to 10.

4. The lubricating oil as claimed in claim 2 or 3, wherein the lubricating oil further comprises a hydrocarbon fluorocarbon an is used for a refrigerator.

* * * * *